Patented Feb. 28, 1933

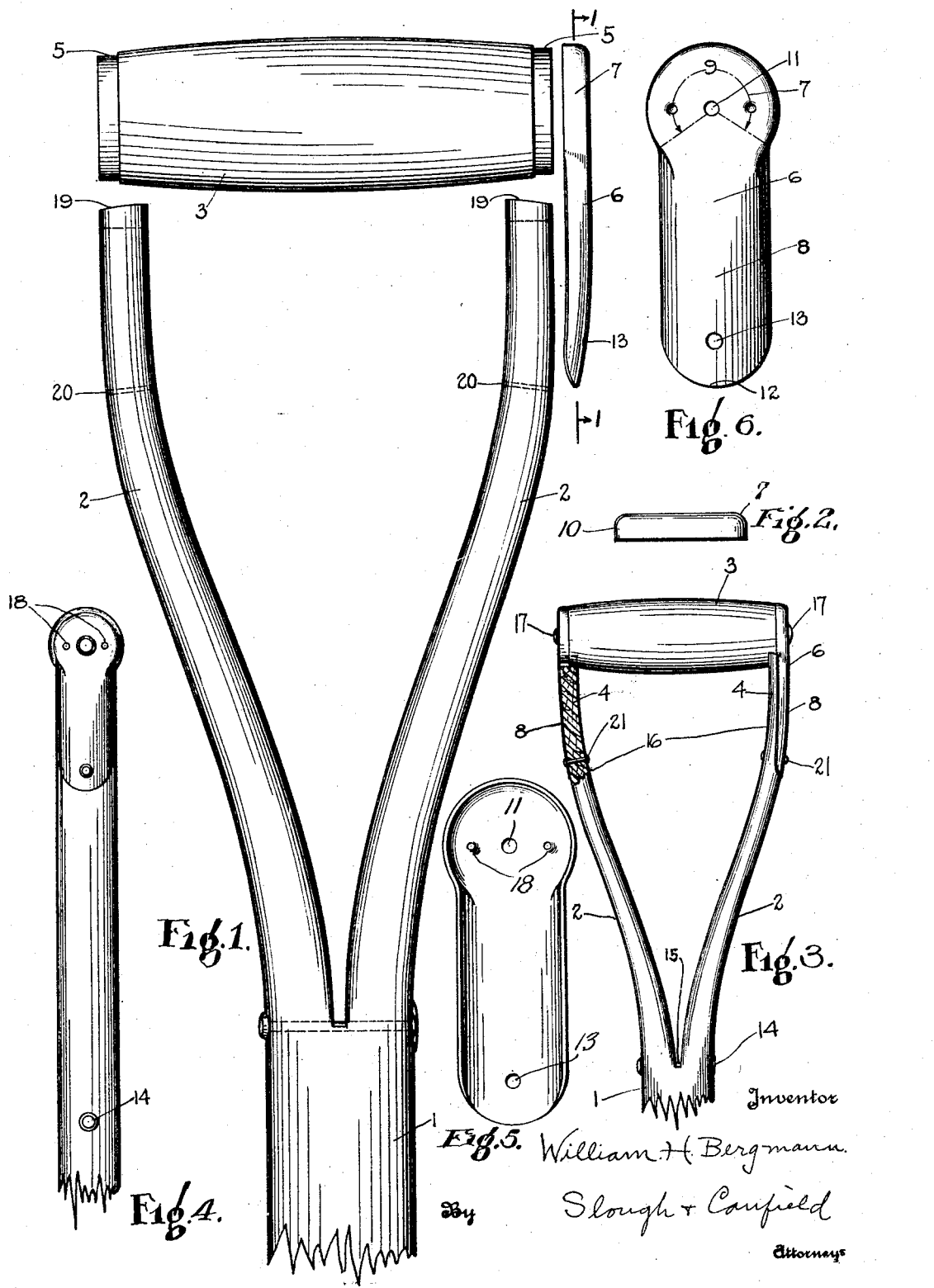

1,899,662

UNITED STATES PATENT OFFICE

WILLIAM H. BERGMANN, OF CLEVELAND, OHIO, ASSIGNOR TO THE AMERICAN FORK & HOE COMPANY, OF CLEVELAND, OHIO, A CORPORATION OF OHIO

D-HANDLE

Application filed November 13, 1930. Serial No. 495,405.

My invention relates to D-handles for implements and relates more particularly to that form of implement D-handles commonly known as wood-split D-handles.

In the making of wood-split D-handles, the shaft of an implement to which a handle is to be applied is longitudinally medially sawed from the handle end to provide a narrow slot extending to approximately a distance of from seven to eight inches.

The split separated portions so provided are then put through a suitable forming operation to cause them to take divergent relative positions toward their ends. The two arms are usually given a compound curved form, so that the ends of the arms are again brought into approximately parallel positions. To the parallel ends, the hand grip is affixed and this has been done in a number of different ways. In affixing the hand grip, consideration must be had to the liability of the handle arms splitting, in use; to the elimination of ragged and sharp edges which might injure or be disagreeable to the hands of the user of the implement; and for each of these reasons, to suitably covering the ends of the transverse hand grip, which is secured to and bridges the ends of the arms; and to the proper securing of the hand grip to the arms, so that a rigid connection is made between such grip and the arm ends.

It is an object, therefore, of my invention to provide an efficient split D-handle structure in which the above enumerated considerations are embodied.

Another object of my invention is to provide a very inexpensive wood-split D-handle of highly efficient construction.

Another object of my invention is to provide for the securing in an inexpensive manner a hand grip yoke element to the ends of the split separated arms of a split-wood implement handle end.

Another object of my invention is to provide a wood-split D-handle grip mounting means, which will effectively protect the ends of the handle arms and hand grip elements.

Another object of my invention is to provide an improved wood-split D-handle wherein a hand grip is rigidly secured to the handle arms in such a manner that there will be no rough or sharp edges manually engageable by the user during handling or use of the implement having such D-handle.

Other objects of my invention and the invention itself will become apparent by reference to the following description of a certain embodiment of my invention and in which reference is had to the accompanying drawing illustrating the said embodiment.

Fig. 1 is an "exploded" front elevational view of the improved D-top of my invention;

Fig. 2 is a top view taken from the lines 1—1 of Fig. 1;

Fig. 3 is a front elevational view partly in section of the embodiment of my invention;

Fig. 4 is a side elevational view of Fig. 3;

Fig. 5 is an enlarged side elevational view of the reinforcing element shown in Fig. 4;

Fig. 6 is a view similar to that shown in Fig. 5, the dotted lines showing a portion thereof transversely rounded on a radius.

Referring to the drawing, the wood handle shaft 1 is provided with a pair of split separated arms 2, which in their intermediate portions are given a compoundly curved form to provide the diverging portions extending from the shaft 1 and the substantially separated parallel ends 4, to which the hand grip, such as that shown at 3 is to be affixed.

The hand grip is of a short length of wood bar, of preferably round cross-sectional form, being, preferably, of greatest diameter at its intermediate portion.

The tips 5 of the hand grip are slightly reduced in diameter to receive a protecting ferrule, which is provided by the sheet steel reenforcing element 6. Two like reenforcing elements 6 are employed, one at each end of the grip, and each comprising a cap portion 7, which merges into a shallow trough-shaped tail piece 8, formed integral with the cap portion 7. The cap portion 7, in the portion indicated by arrows at 9 is of the form of a major portion of a shallow cup having a parti-annular rim flange 10, and is centrally apertured at 11. The tail piece 8 is transversely rounded on a radius, preferably corresponding to the radius of curvature of the exterior surface of the implement shaft 1, and having a preferably rounded tip end edge 12. The tail piece 8 is also longitudinally curved inwardly from its intermediate portion towards its end edge 12.

The reenforcing element 6 is formed from sheet steel and its tail piece is apertured at 13, preferably near its end. A bolt 14 is preferably projected through the handle shaft 1 adjacent the end of the slot 15 initially provided in forming the D-handle arms 2 to prevent further splitting of the handle shaft. The arms 2 may be ground away slightly on their inner surfaces 16 near their ends, in order to give the ends of the arms a more symmetrical tapered form, or the arms may be of uniform thickness throughout their length.

The tips of the arms 2 are provided with transversely extending arcuate end surfaces 19, which are rounded on a radius corresponding to the radius of curvature of the grip bar 3 near its ends. The arms 2 are each provided with one or more apertures 20 extending inwardly from their outer surfaces.

The parts above described are assembled, preferably, by rigidly securing a pair of the reenforcing elements 6 to the ends of the hand grip 3 by forcing the cap portion 7 of said elements onto the slightly reduced tips of the hand grip bar and projecting a bolt 17 through the apertures 11 of the reenforcing elements, and through a previously provided longitudinal bore of the grip bar 3. The bolt being headed over on both ends rigidly holds the reenforcing elements on the grip bar.

Preferably, a pair of brick punch inward projections 18 of the cap portion 7 are then provided, which extend into the wood material of the grip bar ends to prevent relative rotation of the hand grip within the cap portion 7.

The assembled reenforcing hand grip element is then in condition to be affixed to the ends of handle arms 2, formed substantially as previously described, and are affixed thereto by forcing the arms 2 momentarily inwardly, then slipping the grooved portions 8 over the ends of the arms, so that the exteriorly rounded surfaces of the arms are snugly received within the curved grooved concavity provided by the reenforcing element tail pieces 8. Alignment between the apertures 13 and 20 being attained, bolts or rivets 21 are projected through the aligned apertures and headed over to rigidly secure the reenforcing tail pieces 8 to the embraced outer surfaces of the approximately parallel portions of the arm ends.

When so assembled, the transversely concavely curved ends 19 of the arms will receive a portion of the rounded outer surface of the hand grip 3 near its ends, which is curved on approximately the same radius as such arm ends.

Instead of first assembling the reenforcing element 6 onto the hand grip 3, these may be first assembled onto the ends of the arms 2 and then later projecting the hand grip into the recessed cap portions 7 of the reenforcing elements by momentarily spreading the arms while the hand grip bar is inserted, then thereafter inserting the bolt 17.

Having thus described my invention in a certain embodiment, I am aware that departures may be made from the embodiment herein illustrated and described, but without departing from the spirit of my invention.

I claim:

1. In a D-handle, an implement shaft having a pair of split-separated arms extending divergingly therefrom, a hand grip superposed substantially upon the ends of said arms, and a pair of reenforcing elements, each securing an end of said hand grip to one of said arms.

2. In a D-handle, an implement shaft terminating in a pair of split-separated divergent arms, said arms having hollowed ends, a hand grip superposed over and received within said hollowed ends, and a pair of reenforcing elements, each securing an end of said hand grip to one of said arms.

3. In a D-handle, an implement shaft terminating in a pair of split-separated divergent arms, said arms having hollowed ends, a hand grip superposed over and received within said hollowed ends, and separate sheet metal stampings secured to the outer side of each of said arms, each of said stampings terminating beyond their said ends in cap elements, and means securing said cap elements therefor and said grip member together.

4. A split wood D-handle, having a pair of split-separated divergent grip supporting arms, a hand grip superposed over the arm ends disposed partially in hollowed ends thereof, and cap elements for the ends of the grip having extensions, each of said extensions affixed to a different one of said arms, and means to secure the hand grip to the cap elements, intermediately thereof.

5. A split wood D-handle having a pair of split-separated divergent grip supporting arms, a hand grip superposed over the arm ends disposed partially in hollowed ends thereof, and cap reenforcing elements for the ends of the grip having trough-shaped extensions, each of said extensions rigidly secured to a different one of said arms, a bolt projected through axially aligned apertures of each element and longitudinally through said grip, to secure the hand grip to the cap elements, intermediately thereof.

6. A split wood D-handle having a pair of split-separated divergent grip supporting arms, a hand grip superposed over the arm ends disposed partially in hollowed ends thereof, and cap reenforcing elements for the ends of the grip having trough-shaped extensions, a bolt projected through apertures of each extension and an arm to rigidly secure each of said extensions to a different one of said arms, a second bolt projected through axially aligned apertures of each cap element and longitudinally through said grip, to secure the hand grip to the cap elements, intermediately thereof.

7. A split wood D-handle having a pair of split-separated divergent grip supporting arms, a hand grip superposed over the arm ends disposed partially in hollowed ends thereof, and cap reenforcing elements for the ends of the grip having trough-shaped extensions, a bolt projected through apertures of each extension and an arm to rigidly secure each of said extensions to a different one of said arms, a second bolt projected through axially aligned apertures of each cap element and longitudinally through said grip, to sesure the hand grip to the cap elements, intermediately thereof, and means associated with said cap elements to prevent relative rotation of the grip therein.

8. In a D-handle, an implement shaft having a pair of separated arms extending divergingly therefrom, a hand grip superposed upon the ends of the arms, and a pair of tie elements each securing an end of said hand grip to one of said arms and laterally disposed upon the outer faces of said associated grip and arm portions.

In testimony whereof I hereunto affix my signature this 7 day of November, 1930.

WILLIAM H. BERGMANN.